United States Patent [19]
Black

[11] 3,803,968
[45] Apr. 16, 1974

[54] LAMINATE CUTTER
[76] Inventor: Charles R. Black, 127 S.W. 51st Ter., Cape Coral, Fla. 33904
[22] Filed: Aug. 29, 1972
[21] Appl. No.: 284,595

[52] U.S. Cl............... 83/620, 83/635, 83/636, 83/922, 83/613, 83/825
[51] Int. Cl............. B26d 5/10, B26d 7/20
[58] Field of Search............ 83/620, 613, 922, 923, 83/635, 636, 825

[56] References Cited
UNITED STATES PATENTS

| | | | |
|---|---|---|---|
| 3,039,343 | 6/1962 | Richards | 83/923 X |
| 957,747 | 5/1910 | Clifton | 83/825 X |
| 2,260,972 | 10/1941 | Gundlach | 83/620 |
| 3,452,632 | 7/1969 | Brolunnd | 83/635 X |

*Primary Examiner*—Donald R. Schran
*Attorney, Agent, or Firm*—Clarence A. O'Brien; Harvey B. Jacobson

[57] ABSTRACT

A work supporting precision cutting apparatus, for example, an appropriate leg supported table for cutting high pressure laminates expressly designed for use in the cabinet industry, more precisely, laminates which have been sprayed with contact adhesive and which are expeditiously cut into strips designed and adapted to edge cabinet doors.

In keeping with prevailing shop practice it has been necessary, as is known, to cut strips from a sheet of pressure laminate Formica, for example, on a support surface using a table saw. Likewise and following the sawing step it is customary procedure to spray the applicable surface of the cut strips with contact adhesive. This manner of accomplishing the result is laborious, time-consuming and perplexing. For instance, if the sheet of laminate is sprayed before stripping on a table saw, chips of laminate stick to the adhesive and virtually make the cut strips useless. An acceptable solution of the prevailing and exasperating problem invokes the use of a double shearing action which, in turn, involves a vertically liftable and lowerable cleaving blade the cutting edge of which is movable between two coplanar closely spaced fixed bed blades, there being no chips and with the result that the discardable and useless piece is freed, cut out and dropped into an accumulating or collecting bin without coming into contact with the strip to be used.

4 Claims, 4 Drawing Figures

PATENTED APR 16 1974 3,803,968
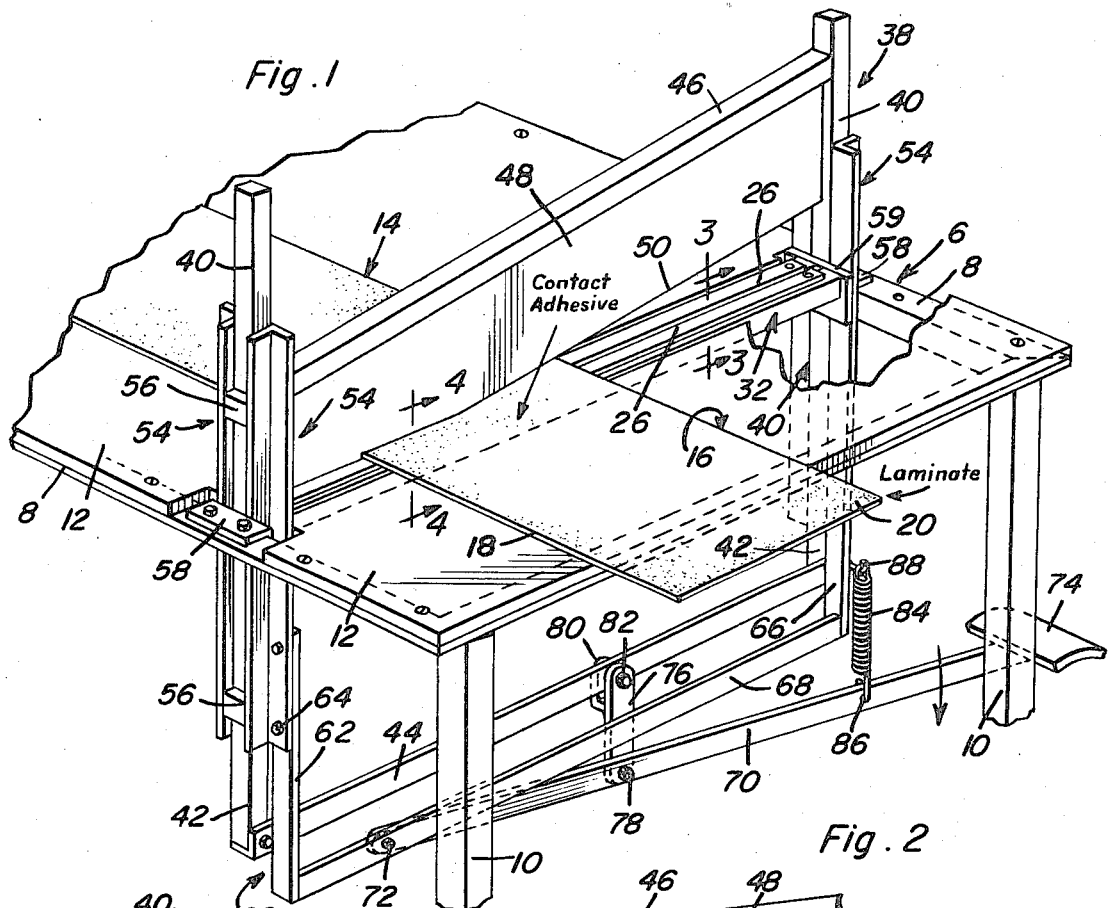

LAMINATE CUTTER

This invention relates to an improved laminate cutter characterized, generally stated, by a table type apparatus and complemental cutting and guiding facilities which conjointly provide an effectually usable apparatus which lends itself to feasible and highly desirable use in a cabinet shop and is such in construction and adaptability that it enables users to cope with the shortcomings of presently followed methods and procedures involving edging of drawers with high pressure laminate and achieves the result desired in such a manner, structurally and otherwise, that it will fulfill the expectations of manufacturers, retailers and shop users who are conversant with the long existing and heretofore unsolved problem.

For background purposes and information indicative of the broad state of the art to which the present invention relates, attention is directed to U.S. Pat. No. 1,992,539 of Feb. 26, 1935; U.S. Pat. No. 2,563,741 of Aug. 7, 1951 and, in addition, U.S. Pat. No. 3,279,295 of Oct. 18, 1966. Certain prior art adaptations are suitable for shearing metal but are not acceptably suitable for cutting laminate because of the fact that prior art facilities available function to shear the piece that is cut off with the result that the Melonite is cracked and not acceptably usable. In fact the piece severed would have to be cut too wide, turned around and cut again. As a result, the steps presently followed involve a waste of time as well as valuable material.

It is also a matter of significance to take into account at the outset that when one uses a pivoted blade the constantly changing angle between the cutting edge and stationary cleaving blades or plates the result, even if satisfactory, is effective only on a short cut, for example, a cut which is 16 inches more or less. Then, too, and at the start of the cut the angle is great enough that the action seems easy but as the cut progresses the angle is reduced and finally stops before an acceptable cut is completed. It is submitted that the only practical way of achieving the end result desirable invokes the use of a blade which initiates the cutting action at the proper angle and maintains that angle throughout the cut. This aspect is mentioned at the outset inasmuch as it constitutes an approach and solution of the problem which as experience has shown has worked out quite satisfactorily. It follows that the present invention is an adaptation which well serves the purposes for which it has been devised and acceptably used.

Briefly the disclosed invention embodies a novel supporting and cutting apparatus characterized by a horizontal table embodying paired opposed fixedly mounted vertically disposed laminate cutter positioning and retaining guides, a pair of complemental horizontal rails bridging the space between and having their respective end portions positively secured to corresponding median portions of the respectively cooperable guides. These rails, preferably angle irons, are fixed in a common plane between and supported by the guides and have longitudinal confronting spaced parallel coplanar cutting blade clearance edges, these for cooperation with a pair of elongated companion anvil-like individual bed plates or blades. These blades are fixed atop the rails in a common plane and have parallel closely spaced laminate shearing edges defining a severing slot through which the severed portion of the laminate strip is forcibly passed and discarded. A vertically liftable and lowerable frame is provided and has vertical assembling and keying posts which are slidingly keyed in the respectively cooperable guides. The frame is provided with fixed but raisable and lowerable cutter blade means with an inclined cleaving edge which is lined up with and is reciprocable toward and from and oriented with the severing slot between the fixed coplanar bed blades or plates.

In carrying out a preferred embodiment of the invention the cutter comprises a frame made up of a pair of vertical posts operable in guides provided therefor, the upper ends of the posts rigidly joined and the lower ends having the cutting or severing blade located therebetween with the cutting edge properly inclined for best cutting results. Many of the component parts take the form of properly associated and connecting angle irons. A lever is provided having a foot piece and this is bracketed to the raisable and lowerable cutting blade frame and coil spring means is provided for returning the lever and frame to an elevated ready-to-use locale.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective showing a fragmentary portion of a leg supported table, the shiftable laminate or workpiece, the cutting blade in a partial cutting position and illustrating, what is more significant, the component parts and the manner in which they are constructed and associated for quick cutting reliable results with the contact cement on the laminate facing upwardly.

FIG. 2 is a fragmentary detail view showing the left-hand end portion of the blade.

FIG. 3 is an enlarged vertical section taken on the plane of the section line 3—3 of FIG. 1 looking in the direction of the indicating arrows.

FIG. 4 is a view similar to FIG. 3 taken approximately on the plane of the vertical section line 4—4 of FIG. 2 and showing the severed piece which has been cut out and is readied for dropping into a bin or other receiver (not shown).

With reference in particular to FIG. 1 the numeral 6 designates an appropriate table of a type commonly used in a custom cabinet shop and having horizontal frame means 8 supported at corner portions by appropriate vertical legs 10 (FIG. 1). The fixed horizontal top surface of the table is denoted at 12. The workpiece, high pressure laminate such as Formica, is denoted, generally stated, by the numeral 14, one end portion which is being acted upon being designated at the right by the numeral 16. The laminate proper (FIGS. 3 and 4) is denoted at 18 and the upwardly facing contact cement surface is denoted at 20. Also as shown in FIGS. 3 and 4 spaced edge portions of the table top sections are denoted at 22, the uppermost surface 24 being shown slightly elevated, that is elevated above the coplanar spaced parallel elongated bed plates or blades 26. These blades are fixed as at 28 atop the horizontal flanges 30 of the horizontal fixedly mounted angle irons or rails 32. The depending or vertical flanges of these two angle irons are denoted at 34 (FIGS. 3 and 4). The coplanar angle irons and also the bed blades are spaced apart to provide the aforementioned blade accommodation and cutting slot 36. The frame-enclosed raisable and lowerable lever actuated blade means is denoted by the numeral 38, this means being characterized by a pair of vertical slidingly keyed posts 40 whose lower end portions 42 (FIG. 1) are connected by a rigidifying and stabilizing angle iron 44. The uppermost slightly inclined frame member of the overall frame means is denoted at 46 and has the raisable and lowerable cutting blade 48 connected thereto and depending therefrom. The oblique angled cutting edge is denoted at 50 and is lined up with the slot means 32 so that it can pass through the laminate or workpiece in the manner shown in FIG. 4 to sever the desired component 52 (FIG. 4) and so that it can gravitate or drop down into a bin or other receiver (not shown). The vertical members or posts 40 are slidingly keyed between the respectively cooperable left and right guides. Each guide embodies spaced parallel angle irons 54 partly joined together in rigid spaced parallelism by upper and lower connectors as at 56 (FIG. 1). Appropriate angle-type cleats or clips are provided at 58 and are rigidly connected to coacting frame members 8 in a manner to maintain the paired angle irons 54 in guide forming relationship. The left hand and right hand end portions of the aforementioned angle irons 32 are securely anchored in place by way of anchoring plates 59. Two of the left and right angle irons 54 of the aforementioned guides have their lower end portions joined by way of a U-shaped rigidifying frame as at 60, the vertical members 62 of which are joined at 64 and the lower end portions 66 being united by a horizontal brace 68.

Attention is directed to the foot actuating means comprising a suitably elongated lever 70 having one end pivoted or hinged in place as at 72 on the stationary horizontal brace 68 and provided at a free accessible end with a foot piece of pedal 74 which is accessibly located. A bracket 76 is arranged as shown in FIG. 1 and pivotally connected at 78 to a median portion of the lever 70. The upper end portion has an L-shaped adapter 80 which is bolted in place on the rigidifying brace 44 as at 82. The coil spring, which is constantly under tension is denoted at 84 and has one end anchored to the lever as at 86, the other end secured detachably to a retaining hook 88 on the guide 54 at the right.

FIG. 1 shows the table and workpiece and the blade partly being operated. FIG. 3 adds thereto and FIG. 4 shows the cutting step and the release of the discardable component 52.

Reverting to the objects and features of the invention and the structural adaptations employed for producing the desired end product and improved results it is to be pointed out that the concept invokes the use of a satisfactory double shearing action which calls for the use of two fixed bed plates 26 on angle-iron-type foundation and supporting rails 32 and one vertically raisable and lowerable inclined pedal-operated cutting blade and more particularly the marginally framed blade 48. With the construction and arrangement shown it is satisfactory to put the contact cement on the laminate, make the cut with the contact cement uppermost, the reason for this being that if the contact cement were faced down the result would tend to cement the same to the two bed blades 26. On the other hand and by facing the contact cement uppermost, the piece 52 (FIG. 4) that constitutes the waste would stick to the bottom of the movable cutter blade. With the construction shown, when the blade goes down between the two bed blades 26 and the cutter blade 48 returns to its normal spring-loaded or elevated position it is readied for the next cutting step, the piece 52 is stripped off by the bed plates and is dropped down into the bin (not shown) below. This improved construction and end result accounts for cutting the laminate with the contact cement uppermost.

Studied consideration of the views of the drawing, singly and collectively will enable the reader to obtain a clear and comprehensive understanding of the individual component parts and the manner in which they are combined to achieve the desired end product and the equally desired result. A more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A supporting and cutting apparatus for high pressure laminate whose upper surface has been sprayed and coated with contact adhesive comprising: a horizontal leg-equipped work supporting table, paired vertically disposed cutter positioning guides affixed to opposite sides of said table, a pair of horizontal rails bridging the space between and having their respective outward end portions positively secured to corresponding median portions of the respectively cooperable guides, said rails being located immediately beneath a slotted underneath side of the top of said table and supportively fixed in a common plane and having longitudinal confronting spaced parallel coplanar cutting blade clearance edges, a pair of complemental elongated anvil-like individual bed plates seated and fixed atop their respectively cooperable rails in a common plane and adjacent but positioned in a plane slightly below the laminate supporting surface of said table top and having parallel closely spaced laminate shearing edges conjointly defining a laminate severing slot through which the severed portion of the laminate is forcibly pressed and discarded into a suitable receiver underlying said slot, a vertically liftable and lowerable frame having vertical assembling and keying posts, said frame encompassing and being provided within its confines with a fixed but bodily raisable and lowerable cutter blade, said blade having an inclined cleaving edge operably aligned with and reciprocable toward and through said severing slot, said guides comprising paired interconnected coplanar angle irons, one pair of said angle irons being supportively located and mounted at the left side of said table, the other pair of angle irons being opposed thereto and supported and located at the right side of said table, a substantially U-shaped reinforcing brace secured to and having a horizontal portion spanning the lower ends of prescribed ones of said angle irons and joining them firmly together, said posts being slidingly and operatively keyed between their respective coacting angle irons, and a horizontal brace spanning the lower ends of said posts and rigidly uniting said posts in coordinating relationship.

2. The laminate supporting and cutting apparatus defined in and according to claim 1, and, in combination, a horizontally disposed foot and leg actuated lever having an inner end operatively pivoted to a median part of the horizontal portion of said U-shaped brace and having a free accessibly projecting end portion provided with a terminal treadle-type foot-piece, a connecting and operating link interposed between and pivotally and operatively connected to corresponding intermediate portions of said lever and said horizontal brace, respectively, and a suitably tensioned readily accessible coil spring having a lower end anchored on a median portion of said lever and an upper end operatively but releasably hooked to an adjacent as well as a coacting end portion of said brace.

3. The supporting and cutting apparatus defined in and according to claim 1, and wherein said rails comprise angle irons each embodying coplanar horizontal flanges which, being in the same plane, permit the severable sheet of laminate to be positioned flatwise for the cutting step with the contact cement-coated side facing upwardly, whereby when the cutting edge of the cleaving blade descends into the limited space between the bed plates and returns to the next elevated cutting position the severed laminate strip is not only keen cut and freed but is cleanly stripped off by the oriented edges of the bed plates and gravitates into a collecting bin provided therefor.

4. A supporting and cutting apparatus for high pressure laminate comprising a work supporting table equipped with a pair of duplicate angle irons constituting horizontal rails and fixedly supported in coplanar relationship and having spaced parallel edges, paired vertically disposed supporting guides having median portions fixed to respective end portions of said rails, said rails having coplanar horizontal flanges, a pair of duplicate spaced parallel coplanar bed plates fixed atop said flanges, a vertically disposed frame having vertical post-like members keyed and slidable in their respectively cooperable guides, said frame having an upper inclined frame member provided on an underneath side with a fixed depending cutting blade, said cutting blade having an inclined cutting edge aligned with and operatively movable between the adjacent edges of said bed plates, said frame being provided at a lower portion with a stabilizing member, a rigidly mounted U-shaped brace, a spring-returned lever having one end pivotally joined to a median portion of said brace and a free end provided with a foot-piece, and a linking and operating connection between coordinating and oriented intermediate portions of the lever and brace.

* * * * *